3,494,898
POLYMERIZATION OF OLEFINIC COMPOUNDS AND POLYMERIZATION CATALYST

Heinz W. Meyer, 1 Arnimstrasse, Munich; Heinz Winter, 23 Jaiserstrasse, and Dieter Schmid, 11 Habenschadenstrasse, both of Pullach, near Munich; and Hans Schwarzer, 25 Mitterweg, Krailling Post Planegg, all of Germany
No Drawing. Continuation-in-part of application Ser. No. 615,926, Feb. 14, 1967. This application Apr. 10, 1969, Ser. No. 815,192
Int. Cl. C08f *1/60;* C07c *73/00*
U.S. Cl. 260—78.5                         11 Claims

ABSTRACT OF THE DISCLOSURE

Novel peresters of isononanoic acid are disclosed and used as catalysts for the polymerization of olefins.

---

This application is a continuation-in-part of our application Ser. No. 615,926 filed Feb. 14, 1967, now abandoned.

This invention relates to the polymerization of olefinic compounds having one or more unsaturated linkages, and to new catalysts for such polymerization processes.

Examples of such compounds are ethylene, propylene, vinyl chloride, vinyl acetate, styrene, acrylic and methacrylic acid esters; esters of maleic, fumaric or itaconic acid; allyl compounds such as diallyl phthalate, diallyl isophthalate, or diallyl glycol carbonate; unsaturated polyester resins (called UP resins hereafter); unsaturated hydrocarbon resins, such as styrene-butadiene copolymers; and others.

Various organic peroxides are available as initiators for such polymerization processes, and in the group of peresters particularly the tert. butyl perbenzoate and the tert. butyl per (2-ethyl) hexoate, which latter is sold in commerce mostly as "peroctoate" and will so be designated hereafter.

Tert. butyl perbenzoate is relatively stable and becomes effective only at elevated temperatures but has the serious drawback to impart a relatively low light stability to the produced polymers. Such polymers easily assume a yellowish discoloration.

In contrast thereto, polymers obtained with the peroctoate have excellent light stability; however, its catalyzing temperature is often undesirably low. This results in a reduced storage life of the monomers containing the peroctoate, which is very harmful particularly in UP resins.

It is, therefore, a principal object of the invention to provide a polymerization process which avoids the recited drawbacks.

Another object of the invention is to provide catalysts which do not initiate polymerization of olefinic compounds at low temperatures and do not impart light sensitivity to the produced polymers.

Other objects and advantages will become apparent from a consideration of the specification and claims.

In accordance with this invention, we have found that the peresters of 3,5,5-trimethylhexanoic acid (isononanoic acid) satisfy all the requirements recited hereinabove. Polymers obtained with said catalysts have the same light stability as those obtained with peroctoates and are, therefore, in this respect superior to those produced with perbenzoates. Furthermore, the monomers containing the novel peresters of isononanoic acid exhibit substantially improved storage properties at room temperature while they promote polymerization even better than the perbenzoates at higher temperatures.

The peresters of the invention have the formula

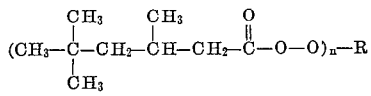

wherein $n$ is an integer from 1 to 2 and R is a saturated hydrocarbon radical having 1 to 18 carbon atoms and connected through $n$ of its carbon atoms by per oxygen linkage to the acyl rest.

The tert. butylperester of the isononanoic acid has the formula

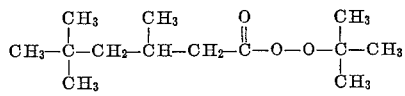

and can be prepared as follows:

1.4 kg. of isononanoic acid (3,5,5-trimethylhexanoic acid) are reacted in a mole ratio of 3:1.3 with 0.53 kg. of phosphorus trichloride at 60° C. to form the chloride of the acid. After removal of the phosphorous acid which forms the heavy phase, the crude isononanoic acid chloride (1.75 kg.) is added together with 1.8 kg. of 13.3% NaOH at 20° C. under stirring and cooling to 1.125 kg. of 80% tert. butylhydroperoxide, whereby the acid chloride is introduced below the surface of the reaction liquid. After the reaction is completed, stirring is continued at 20° C. for 15 minutes. There are obtained 1.98 kg. of an 80% perester which is free of tert. butylhydroperoxide. Yield: 78.0% calculated on 3,5,5-trimethylhexanoic acid; 72.7%, calculated on tert. butylhydroperoxide.

Other alkylperesters, e.g., the amylperester of the isononanoic acid are similarly prepared by using the corresponding alkylhydroperoxide.

A diperester of isononanoic acid of the formula

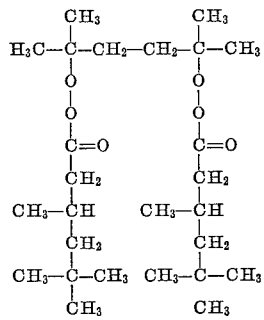

was prepared as follows:

270 g. (1.5 moles) of 2,5-dihydroperoxy-2,5-dimethylhexane were dissolved with stirring in a solution of 210 g. (3.75 moles) of KOH in 2.1 liters of water, tap water being used for cooling. 15 ml. of a wetting agent were added, and then 583 g. (3.5 moles) of isononanoyl chloride were added dropwise within 3 hours. Stirring was then continued for 2 more hours. The organic phase was treated with saturated aqueous sodium sulfate solution and dried over sodium sulfate. There were obtained 515 g. of an oily liquid which had a content of 93.9% diperester. The yield of the pure diperester was, therefore, 70.3 percent of theory. The ester may be designated 2,5-diisononanoylperoxy - 2,5 - dimethylhexane or 2,5 - dimethylhexenyl 2,5-diperisononanoate.

In the preparation of the peresters, the wetting agent is not absolutely necessary and can be omitted. Both the hereinabove described similarly prepared peresters of isononanoic acid are entirely stable at room temperature and have excellent storability. Their manipulation, even without addition of any phlegmatizing agent, does not present any danger.

Even in the polymerization of ethylenically unsaturated monomers having a single double bond, the per-isononanoates are superior to the conventional peresters such as peracetate or perbenzoate; the rate of reaction is greater and the content of residual monomers is considerably smaller (see e.g. below Table 1 for styrene and Table 2 for methylmethacrylate).

The uncured polyester resin composition (UP resin) used in the following (Examples 3–6) was a mixture of 70 parts by weight of an unsaturated polyester with 30 parts by weight of styrene, which contained 0.01 part by weight of hydroquinone. The uncured, unsaturated polyester was prepared by esterification of 2 moles of maleic acid and 1 mole of phthalic acid with 3.3 moles of propanediol.

With respect to the yellowing tendency, Table 3 shows that test plates prepared from said mixture with per-isononanoate as catalyst were substantially equivalent to those made with peroctoate and distinctly superior to those made with perbenzoate.

Table 4 shows the considerably increased storability of the perisononanoate over that of the tert. butylperoctoate. Such improved stability presents the possibility of storing mixtures with monomers for extended periods of time without the risk of premature polymerization. This is particularly important for the processing of unsaturated polyester resins for which it is frequently required to store batches already containing the catalyst for considerable times. The storability can be, of course, further improved by the addition of suitable fillers or inhibitors.

A particularly surprising effect of the peresters of isononanoic acid is that they provide mixtures with ethylenically unsaturated polymerizable compositions which have a longer shelf life than those with tert. butylperbenzoate and that, on the other hand, they develop at elevated temperatures a greater reactivity than the tert. butyl perbenzoate. Said effect is shown in Tables 4 and 5. Compared with peroctoate, the peresters of isononanoic acid have a considerably higher decomposition temperature; for this reason, they are very useful as catalysts for monomers which must be polymerized at rather high temperatures, such as the allyl compounds, where the peroctoate alone, due to its fast decomposition, does not give satisfactory results.

For heat curing, the peresters of the isononanoic acid can be activated by cobalt or vanadium compounds in such a way that the curing times are shortened or lower curing temperatures can be used. Curing at room temperature in the presence of vanadium accelerators is shown in Table 6.

When cobalt or vanadium compounds are added to the batches when mixed, the pot life can be prolonged by addition of inhibitors such as polyvalent phenols or hindered alkyl phenols and the like, without prolonging the later cure.

The following examples are given to illustrate the invention. All figures refer to parts or percentages by weight, unless indicated otherwise. "mval." is used to designate "milliequivalents."

EXAMPLE 1

30 g. each of monostyrene, conventionally stabilized, were admixed with 3 mval. of a peroxide and polymerized in closed glass vessels at 90° C.

The results obtained with tert. butylperisononanoate and tert. butylperbenzoate as catalysts are given in Table 1.

TABLE 1

| | Reacted monomer, percent | |
|---|---|---|
| | t-Butyl perisononanoate | t-Butyl perbenzoate |
| Reaction time (hours): | | |
| 1 | 17.5 | 14.1 |
| 3 | 42.5 | 35.0 |
| 24 | 99.6 | 99.0 |
| | Residual monomer, percent | |
| 24 | 0.4 | 1.0 |

EXAMPLE 2

30 g. each of methylethacrylate, distilled under nitrogen, were polymerized under nitrogen in a glass vessel in a thermostat at 70° C. with 3 mval. of t-butylperisononanoate, t-butylperbenzoate, and t-butylperacetate, as set forth in Table 2.

TABLE 2

| | t-Butyl perisononanoate | Percent reacted monomer t-butyl-perbenzoate | t-Butyl-peracetate |
|---|---|---|---|
| Reaction time (hours): | | | |
| 1 | 21.5 | 15.4 | 15.4 |
| 3 | 88.6 | 33.0 | 35.1 |
| 6 | 99.3 | 98.2 | 97.8 |
| | Residual monomer | | |
| 6 | 0.7 | 1.8 | 2.2 |

EXAMPLE 3

Test plates of the uncured polyester resin prepared as set forth above from a maleic acid-phthalic acid-propanediol condensation product and styrene, were cured for 3 hours at 70° C. on a waterbath between glass plates and, after having been stored for 24 hours at room temperature, were tempered for 4 hours at 100° C.

Table 3 shows the reflectance values determined, after the times indicated for weathering and exposure to light, in a Xeno-test by means of a Zeiss-Elrepha instrument at the indicated wavelengths.

TABLE 3

| | Directional reflectance after hours | | | |
|---|---|---|---|---|
| | 0 | 300 | 600 | 900 |
| 2% catalyst | 406–420m | 460–420m | 460–420m | 460–420m |
| t-Butylperoctoate, percent | 68.7–61.3 | 67.8–61.8 | 67.2–61.0 | 66.6–60.1 |
| t-Butylperisononanoate, percent | 68.5–61.2 | 66.9–60.3 | 66.7–60.1 | 65.9–59.0 |
| t-Butylperbenzoate, percent | 67.1–58.8 | 62.2–53.1 | 60.5–49.0 | 59.3–46.7 |

EXAMPLE 4

Storability of unsaturated polyester resins containing peroxide initiators 50 g. each of the uncured polyester resin of Example 3 containing 2 percent of the respective perester were stored in the dark in sealed glass bottles at 20° C. and the time was determined at which gelation of the resin started.

TABLE 4

Peroxide: Storage time, days
- t-Butylperoctoate _____ 9
- t-Butylperbenzoate _____ 64
- 2,5-dimethyl-2,5-dibenzoyl peroxyhexane _____ 5
- t-Butylperisononanoate _____ 165
- 2,5-dimethyl-2,5-diisononanoyl-peroxyhexane __ 72

EXAMPLE 5

Curing of unsaturated polyester resins 1 g. of a peroxide catalyst was admixed to 50 g. of the polyester resin, the resins were filled in test tubes of 30 mm. diameter, and the tubes were placed in a constant temperature bath. The time to starting gelation ($t_{gel.}$) was visually observed, and the time to reach the maximum temperature ($t_{max.}$) and the maximum temperature ($T_{max.}$) were measured by thermocouples and recorded by a multicolor recorder.

The results are given in Table 5.

TABLE 5

| Peroxide | Bath temp. 80° C. | | | Bath temp. 100° C. | | |
|---|---|---|---|---|---|---|
| | $t_{gel.}$ | $t_{max.}$ | $T_{max.}$ | $t_{gel.}$ | $t_{max.}$ | $T_{max.}$ |
| | min. | min. | ° C. | min. | min. | ° C. |
| t-Butylperoctoate | 5 | 8 | 230 | | | |
| t-Butylperisononanoate | 37 | 45 | 217 | 6 | 7 | 242 |
| 2,5-diisononanoylperoxy-2,5-dimethylhexane | 27 | 34 | 220 | 5 | 7 | 246 |
| t-Butylperbenzoate | 65 | 68 | 217 | 9 | 12 | 250 |

EXAMPLE 6

Curing of unsaturated polyester resins with perester initiators and vanadium catalyst The same resin was employed as used in the preceding examples. For each test 50 g. were used, and the determinations were made as set forth in Example 5.

The vanadium catalyst was vanadyl-p-toluenesulfonate dissolved in a mixture of isopropanol and xylene. The solution contained 1 percent of metal.

TABLE 6

| Peroxide | Vanadium catalyst, percent | $t_{gel.}$ min. | $t_{max.}$ min. |
|---|---|---|---|
| 1.5% t-butylperisononoate | 0.3 | 23 | 40 |
| 1.5% 2,5-dimethyl-2,5-diisononanoylperoxyhexane | 0.3 | 3 | 8 |

What is claimed is:

1. Peresters of 3,5,5-trimethylhexanoic acid of the formula

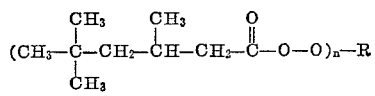

wherein $n$ is an integer from 1 to 2 and R is a saturated hydrocarbon radical having 1 to 18 carbon atoms and connected through $n$ of its carbon atoms by peroxygen linkage to the acyl rest.

2. A perester as claimed in claim 1 wherein R is

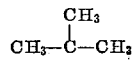

and $n$ is 1.

3. A perester as claimed in claim 1 wherein R is

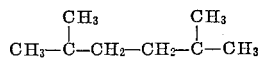

and $n$ is 2.

4. A process for the polymerization of olefinic compounds comprising subjecting an olefinic compound to polymerizing conditions in the presence of a compound of claim 1.

5. The process as claimed in claim 4 wherein said olefinic compound is at least one unsaturated carboxylic ester.

6. The process as claimed in claim 5 wherein said unsaturated carboxylic ester contains as a polymerization promoter a member of the group consisting of cobalt and vanadium compounds.

7. The process as claimed in claim 4 wherein said perester is the tert. butylperester.

8. The process as claimed in claim 4 wherein said perester is 2,5-diisononanoylperoxy-2,5-dimethylhexane 9. A polymerizable mixture comprising an olefinic compound and a perester of claim 1.

10. The mixture of claim 9 wherein said olefinic compound is an uncured unsaturated polyester.

11. A polymer prepared by the process of claim 4.

References Cited

UNITED STATES PATENTS 2,567,615  9/1951  Milas _____ 260—502 XR
3,138,627  6/1964  Harrison et al. ___ 252—426 XR JOSEPH L. SCHOFER, Primary Examiner J. KIGHT III, Assistant Examiner U.S. Cl. X.R.

252—426; 260—45.7, 78.5, 82.1, 83.7, 85.7, 86.1, 89.1, 89.3, 89.5, 92.8, 93.5, 94.9, 502, 683.15